United States Patent [19]
Wehling

[11] Patent Number: 5,892,477
[45] Date of Patent: Apr. 6, 1999

[54] ANTI-JAM FM/CW RADAR

[75] Inventor: John H. Wehling, Redondo Beach, Calif.

[73] Assignee: TRW Inc., Redondo Beach, Calif.

[21] Appl. No.: 748,327

[22] Filed: Nov. 13, 1996

[51] Int. Cl.$^6$ .................................................. G01S 7/36
[52] U.S. Cl. ............................................................. 342/18
[58] Field of Search ................................ 342/16, 17, 18, 342/19

[56] References Cited

U.S. PATENT DOCUMENTS

| | | | |
|---|---|---|---|
| 3,878,525 | 4/1975 | Alders | 342/18 |
| 3,981,013 | 9/1976 | Christensen | 342/18 |
| 4,338,604 | 7/1982 | Petitjean | 342/18 |
| 4,546,356 | 10/1985 | Petitjean et al. | 342/17 |
| 5,086,300 | 2/1992 | Ashmore | 342/20 |
| 5,291,202 | 3/1994 | McClintock | 342/16 |
| 5,307,069 | 4/1994 | Evans | 342/19 |
| 5,377,222 | 12/1994 | Sanderford, Jr. | 371/1 |

*Primary Examiner*—Charles T. Jordan
*Assistant Examiner*—Christopher K. Montgomery
*Attorney, Agent, or Firm*—Michael S. Yatsko

[57] ABSTRACT

A radar system (10) uses independent, adaptive modulation controls for the local oscillators (16, 40) in the transmitter (24) and receiver (26) portions. The adaptive modulation enables the radar to filter out any repeater jammer signal while maintaining a good signal-to-noise ratio (SNR) on the target. The radar system (10) provides a SNR that is sensitive to the target range and minimizes the SNR at the jammer range and maximizes the SNR at the target range. A communication system (60) similarly uses independent, adaptive modulation controls (66, 84) to provide a communication system resistant to jamming.

3 Claims, 4 Drawing Sheets

ANTI-JAM FM/CW RADAR

TECHNICAL DESCRIPTION

This invention relates generally to radar and communication systems and, more particularly, to the use of independent, adaptive modulation controls for oscillators in transmitters and receivers used in radar and communication systems to modulate a radio frequency carrier for the purpose of countering a jammer or similar device that attempts to defeat the operation of the radar or communication systems.

BACKGROUND OF THE INVENTION

In a typical radar system, a radar antenna outputs a modulated signal in the direction of an object which is the subject of the radar inquiry. The object reflects the emitted signal back toward the radar system and the returned signal is compared against a saved version of the originally emitted signal. Based on correlations between the emitted and returned signals, various information regarding the target can be determined. For example, in relatively simple systems, the relative velocity between the object and the radar system can be determined in accordance with the Doppler shift between the emitted and returned signals. In more complex radar systems, signal processing techniques performed on the reflected signal yield data regarding the size, shape, range, and direction of the object.

In some radar applications, a radar defeat system, such as a standoff jammer, attempts to defeat the radar system by detecting the emitted signal, copying the emitted signal, and returning a modified version of the copied signal so that the modified signal deceives the radar system. Where the radar signal periodically repeats, the radar defeat system may simply copy and send a delayed version of the copied radar signal to deceive the radar system.

A radar signal having an easily detected and repeatable modulation scheme is more easily copied. For example, a conventional radar system may yield the range, velocity, and bearing to a target. In such applications, standoff jammers store the incoming radar signal in memory and determine the repeat interval of the signal. The standoff jammer then emits a signal replicating the return signal expected by the radar system. The signal emitted by the standoff jammer is delayed so that the return signal emitted by the standoff jammer arrives before the return signal would normally arrive for a given distance between the radar system and the object. This signal deceives the radar system into determining that the object is at a different range, velocity, and bearing than it actually is.

Existing radar systems often use repetitive waveforms to enable range determination. A pseudo-random noise sequence provides one example of a modulation waveform. In the pseudorandom noise sequence, the radar system emits binary sequences characteristic of a noise waveform, but which is repeated after a predetermined timed interval. Another modulation format is frequency modulation continuous wave (FM/CW), also referred to as swept-frequency or chirp waveforms. Yet another modulation format is medium pulse repetition. In medium pulse radar, the transmit waveform modulation is a train of pulses, and the range to an object is determined by the delay between transmission and reception of the pulse.

The above-described modulation waveforms are deterministic. The deterministic characteristic enables intelligent standoff repeater jammers to store the radar signal, modify the signal, and retransmit the delayed signal back toward the radar system so that the target appears other than it actually is. Thus, the radar system receives and interprets a return signal which does not properly indicate the object.

A radar system may also have multiple radio frequency phases. For example, a 255-bit or 511-bit, maximal-sequence, pseudo-random waveform modulation may be used to detect the range from the radar to the target. This code bi-phase modulates the radio frequency (RF) carrier using a binary sequence. The modulation of the signal returned from the target is correlated with delayed images of the originally emitted 255-bit code. A correlation occurs when the delay is equivalent to the target range. Samples of the correlated output are then processed by standard signal processing techniques so that the target is detected.

For example, assume an approximate signal propagation velocity of one foot per nanosecond and a straight line two-way travel path. If the time delay of a single bit of the code modulation is ten nanoseconds (ns) then a delay of one bit in the returned signal would indicate a distance to the target of five feet. Similarly, five bits or 50 nanoseconds of delay indicates a range of 25 feet, and a 255-bit delay indicates a range of 1275 feet. This range for a 255-bit, 1275 feet, is called the unambiguous range. Delays beyond 255-bits fall into an ambiguous range. For example, a delay of 256-bits indicates a range of five feet because the periodic nature of the 255-bit code. Thus, if a standoff radar jammer can store the repetitive waveform, amplify it, and transmit the waveform back with the proper delay, the target carrying the jammer can be made to look closer in range than it actually is.

In addition to radar systems, electronic communication can similarly be disrupted by jammer units. For example, when a communication jammer unit detects a communication signal, the jammer unit can search for repetitive waveforms within the communication signal, duplicate those waveforms, and transmit a modified copy of the signal. This modified signal no longer contains the same information as the originally emitted signal.

Thus, it is an object of the present invention to provide radar and communication systems which emit and receive an electromagnetic signal which is substantially immune from standoff jamming.

It is a further object of the present invention to provide radar and communication systems which send and receive modulated electromagnetic signals having information encoded therein.

It is yet a further object of the present invention to provide radar and communication systems which emit an electromagnetic signal modulated by a local oscillator and receive an electromagnetic signal which may be demodulated by a similar local oscillator.

It is yet a further object of the present invention to provide radar and communication systems which use independent, adaptive modulation controls for local oscillators in the transmitter and receiver to filter out a repeater jammer signal while maintaining a good signal-to-noise ratio (SNR) on the radar target or communication signal.

It is yet a further object of the present invention to provide radar and communication systems having anti-jam capability which adjust the transmit and receive modulation signals to minimize the signal-to-ratio at the jammer range while maximizing the signal-noise-ratio at the radar target range or to the communication system range.

It is yet a further object of the present invention to provide radar and communication systems having anti-jam capability in which the anti-jam modulations are sufficiently flexible to continue tuning to the radar and communication signal while the range to the jammer and to the target or other communication system are both changing.

SUMMARY OF THE INVENTION

In accordance with the teachings of the present invention, this invention is directed to a radar system for emitting a transmit signal toward an object and receiving a return signal reflected from the object. The radar system includes a signal processor for generating control commands to encode the transmitted signal and decode the received signal. A transmit local oscillator is responsive to the control commands from the signal processor and generates a modulation signal having an anti-jamming code for transmission by the radar system. A radio frequency oscillator generates a carrier signal which is modulated by the modulation signal, and the modulated signal is transmitted by the radar system. A receive local oscillator is responsive to the control commands from the signal processor and generates a signal to remove the anti-jamming code from the returned signal. The signal varies in accordance with the modulation signal, and the transmit and receive local oscillators are controlled independently.

Additional objects, features and advantages of the present invention will become apparent from the following description and the appended claims, taken in connection with the accompanying drawings.

DETAILED DESCRIPTION OF THE INVENTION

Figure 1:
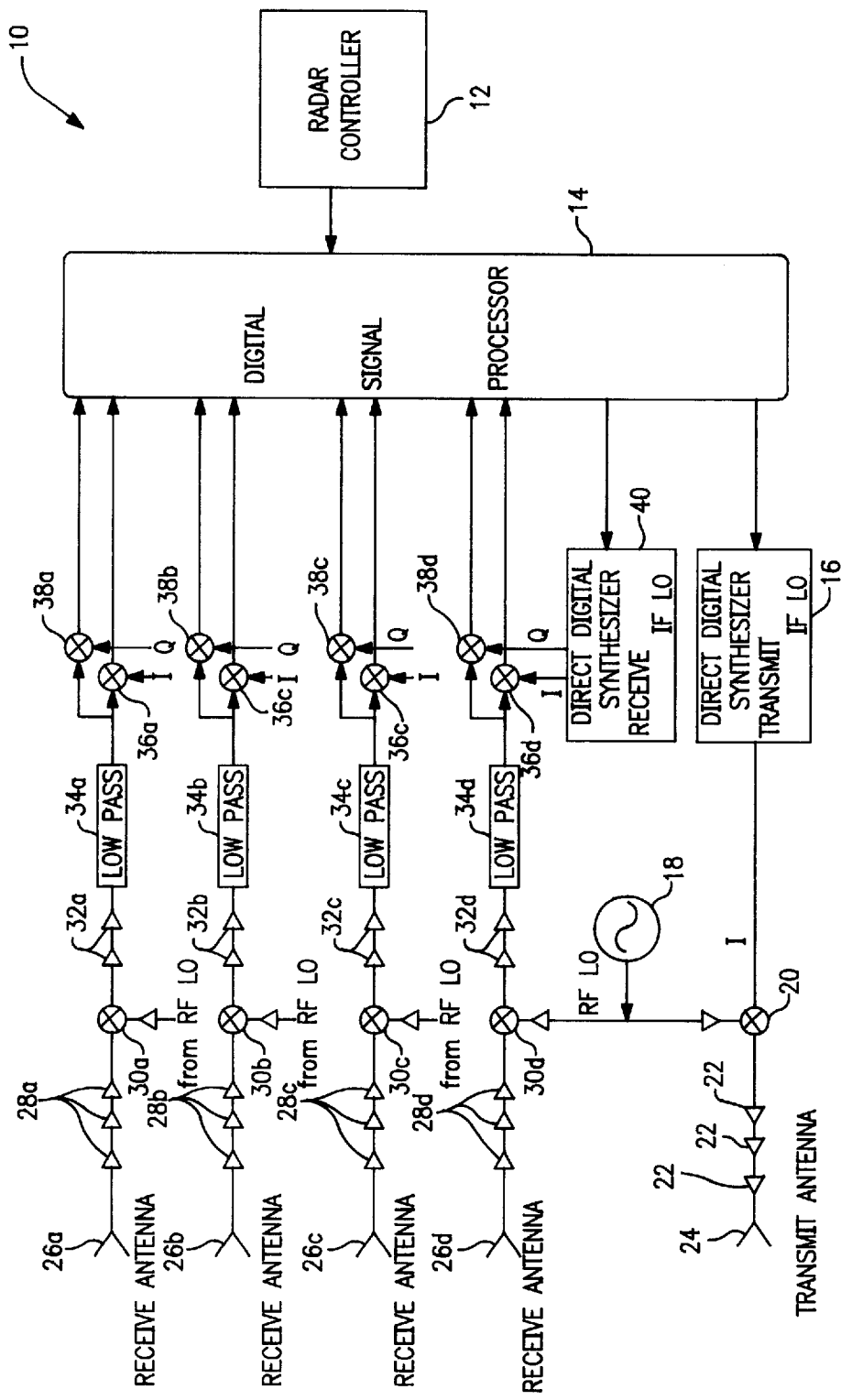
FIG. 1 is a block diagram of a radar system having independent, adaptive modulation controls for the local oscillators arranged in accordance with the principles of the present invention.

FIG. 1 is a block diagram of a radar system 10 arranged in accordance with the principles of the present invention. In the radar system 10 a radar controller 12 directs overall operation of the radar system 10. The radar controller 12, in particular, generates transmit and receive modulation control codes specifically directed to suppress repeater jammers directed to disrupting operation of the radar system 10. The radar controller 12 outputs the control codes to a digital signal processor (DSP) 14.

DSP 14 generates control commands to operate transmit intermediate frequency local oscillator (IF LO) 16. Transmit IF LO 16 is implemented using a direct digital synthesizer (DDS). The direct digital synthesizer provides both phase and frequency control of an output signal and, thus, provides the precision required to implement the dual modulation transceiver designed concept of the present invention. In accordance with the control commands, the DDS digitally synthesizes a local oscillator (LO) signal with the desired modulation. DSP 14 provides control commands to transmit IF LO 16 in real time control so that the carrier signal I output by transmit IF LO 16 can be varied as required.

Transmit IF LO 16 outputs an intermediate frequency (IF) carrier signal having both an in-phase component (I) and a quadrature component (Q). Radar system 10 uses only the in-phase component I of the IF carrier signal for transmission. If IF carrier signal functions as a modulation signal for the signal transmitted by the radar system 10.

Radio frequency local oscillator (RF LO) 18 outputs a sinusoidal signal modulated by the IF carrier signal output by transmit IF LO 16. A mixer 20 effects a frequency addition between the IF carrier signal and the RF carrier signal output by the RF LO 18. The mixer 20 thus generates an output signal for transmission by the radar system 10 defined as ($F_c + F_{RF}$), where $F_c$ is the IF carrier signal frequency output by transmit IF LO 16 and $F_{RF}$ is the RF carrier signal frequency output by RF LO 18. The output signal ($F_c + F_{RF}$) is suitably conditioned by an amplifier chain comprising a trio of amplifiers 22 and transmitted by transmit antenna 24.

The reflected radar signal is detected by a quartet of radar receive antennas 26a, 26b, 26c, and 26d. The quartet of receive antennas 26a–d comprise a four channel monopulse angle measurement antenna configuration. The four receive antennas 26a–d of radar system 10 cooperate to provide both range, speed, and angle information on the target. One skilled in the art will recognize that one receive channel individually can provide range and speed information, and all four channels cooperate to provide angle information. Each of the receive antennas 26a–d output the received signals to an amplifier chain comprising a trio of amplifiers 28a, 28b, 28c, and 28d, respectively. Amplifiers 28a–d condition the received signals prior to input to mixers 30a, 30b, 30c, and 30d, respectively. The RF carrier signal output by RF LO 18 is also input into each of mixers 30a–d. Mixers 30a–d each effect a frequency subtraction $F_{DMOD} = (F_{RTN} - F_{CAR})$, where $F_{DMOD}$ is the frequency of the demodulated signal, $F_{RTN}$ is the frequency of the return signal detected by the respective antennas 26a–d and $F_{CAR}$ is the frequency of the RF carrier signal output by RF LO 18. The mixers 30a–d output the demodulated signal to an amplifier chain comprising amplifiers 32a, 32b, 32c, and 32d, respectively. Amplifiers 32a–d condition the demodulated signal output by the respective mixers 30a–30d. Low pass filters 34a, 34b, 34c, and 34d ensure that each of the signals output by mixers 30a–d embody a subtraction of the modulation signal from the returned signals by filtering out any high frequency component of the signals output from mixers 30a–d. Low pass filters 34a–d thus output the returned signal with the RF carrier signal from RF LO 18 subtracted from the returned signal.

The signal output by low pass filters 34a–d is then input to mixers 36a and 38a, 36b and 38b, 36c and 38c, and 36d and 38d, respectively. Intermediate frequency local oscillator (IF LO) 40 outputs both I and Q components of IF carrier signal to each of the mixers 36a–d and 38a–d, respectively. The receive IF LO 40 is implemented as a DDS, similarly to transmit IF LO 16. The DDS synthesizes the IF LO signal with the desired modulation selected by DSP 14. Mixers 36a–d subtract the in phase I component from the return signal to yield ($F_{DMOD} - F_I$), where $F_I$ is the frequency of the in-phase component I of the IF carrier signal output by receive IF LO 40. Similarly, mixers 38a–d subtract the quadrature component Q of the IF carrier signal output by receive IF LO 40. This yields ($F_{DMOD} - F_Q$), where $F_Q$ is the frequency of the IF carrier signal output by receive IF LO 40. The resultant signals are then input to DSP 14. The signals input to DSP 14 contain the demodulated return signal and noise. Digital signal processor 14 then decodes the returned signal to provide information about the targeted object.

Figure 2:
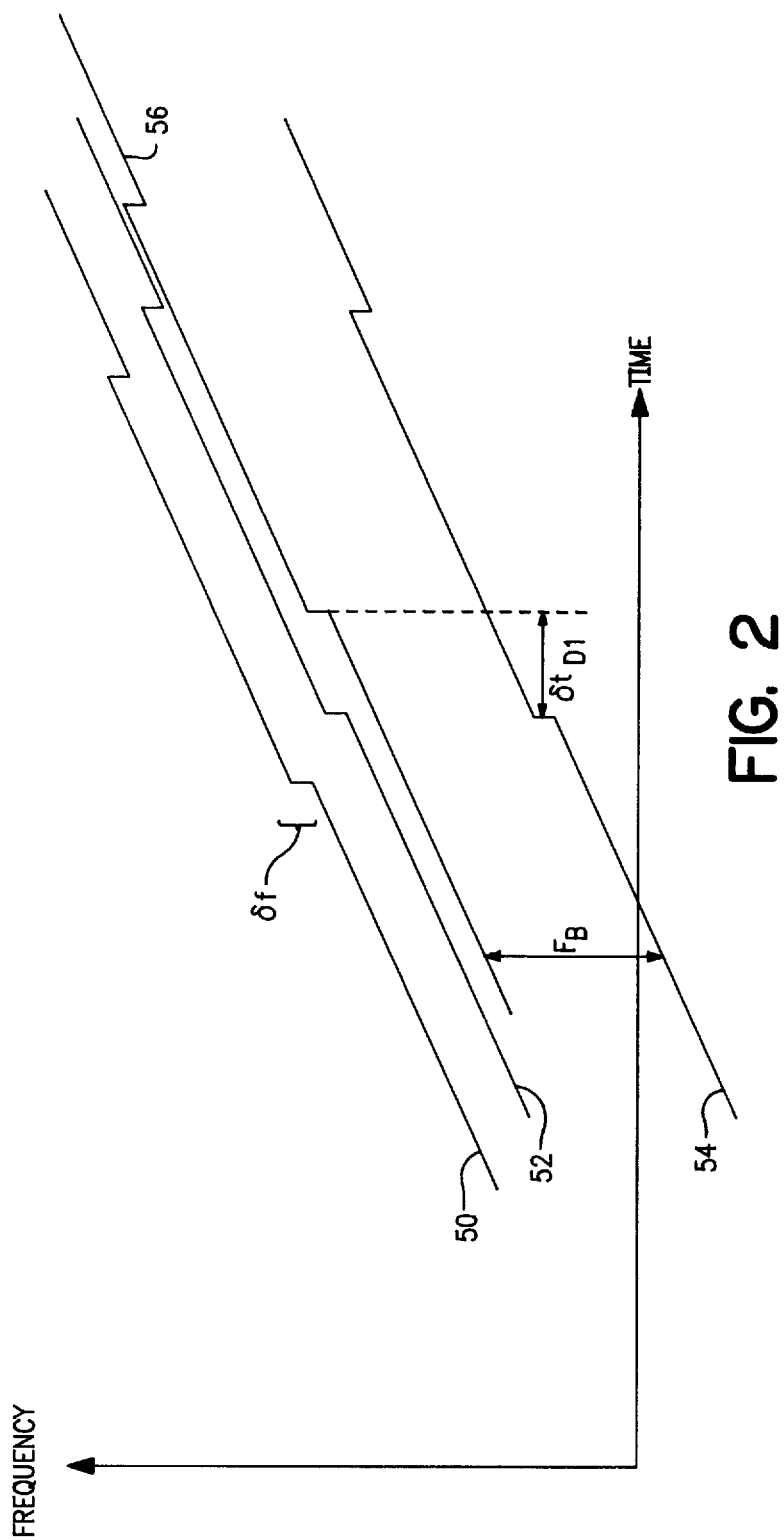
FIG. 2 is a graph of the radar signals transmitted and received by the radar system of FIG. 1.

FIG. 2 shows waveforms plotted in a time versus frequency domain to demonstrate the operation of the radar system 10 of FIG. 1. The radar system 10 of FIGS. 1 and 2 detects targets, by way of example, using a modified version of standard linear modulation (LFM). This modified LFM comprises standard LFM with a coded sequence of up and down frequency shifts having a code deviation δf added to the LFM. The sequence of coded up and down shifts is coded in a random or pseudo random manner.

FIG. 2 depicts three exemplary intervals of the coded up/down frequency shifts. The radar system 10 emits a transmit signal 50 via transmit antenna 24. The transmit signal 50 includes a variable frequency shift δf, which is introduced by operation of the DDS which transmit IF LO 16. The variable frequency shift δf provides the anti-jam feature of the radar system 10. The quartet of receive antennas 26a–d detect a return signal. Waveform 52 represents an exemplary target return signal detected by one of the receive antennas 26a–d. To simplify processing, waveform 52 is offset from receive IF LO 40 waveform 54 by a predetermined frequency $f_B$. The repeater jammer signal 56 is offset by a time $\delta t_{DJ}$ which results from the delay in the jammer circuitry and the difference in the range between the position of the jammer and the position of the target.

Typically, a repeater jammer matches the transmitter modulation, thus attempting to introduce a false target in the radar return signal. To suppress the matched transmitter modulation output by the repeater jammer, the DSP 14 outputs control signals to the transmit IF LO 16 to match the Doppler shifted transmit modulation, delayed in time to match the target range delay. This adaptive range delay and Doppler matching eliminates the effects of the code in the real target baseband signal 54. The jammer signal 56, however, retains the frequency code modulation due to the time delay $\delta t_{DJ}$ between the repeater jammer modulation and the receive IF LO 18 modulation.

Further, LFM target baseband signals are typically detected using a fast fourier transform (FFT) algorithm executed in the DSP 14. The FFT detection operates suitably for a tracked target so long as the receive IF LO 40 properly follows the target Doppler and range delay. For example, if the LFM is a single frequency ramp, a real target in the FFT power spectrum will be a single narrow peak. FFT detection of the jammer signal, however, will be defocused due to residual FM code modulation. This residual code modulation will spread the energy from the jammer signal power spectrum over a bandwidth equal to the code rate. The code deviation (δf) can be tuned to minimize jammer interference in the FFT power spectrum. This anti-jam technique is difficult to counter because the jammer is denied knowledge of the receive LO timing.

It will be understood by one skilled in the art that the anti-jam technique is not restricted to radars using LFM, and that other modulation techniques for radar systems will yield similar results. Generally, any combination of transmit and receive modulations producing a range and/or Doppler sensitive target detection signal-to-noise ratio can be used. Further yet, the present invention also provides the capability to match the delay from the receive IF LO 40 to the target delay in a frequency modulation/continuous wave (FM/CW) radar system. The delay eliminates power loss normally caused by speed of light delay of the target return signal. This delay also increases the flexibility in selection of a waveform. One skilled in the art will also recognize that in a radar with a single local oscillator, the target return difference frequency increases with target range, assuming a linear frequency modulation. This requires an increase in the digitizer sampling rate. The dual IF LO's 16 and 40 of FIG. 1 provide a convenient means to control this sampling variation. Further yet, the frequency slope is no longer constrained by the necessity of having to maintain the target difference frequency below the digitizer frequency, relative to the transmit local oscillator. Thus, the user has greatly increased flexibility in waveform selection.

Figure 3:
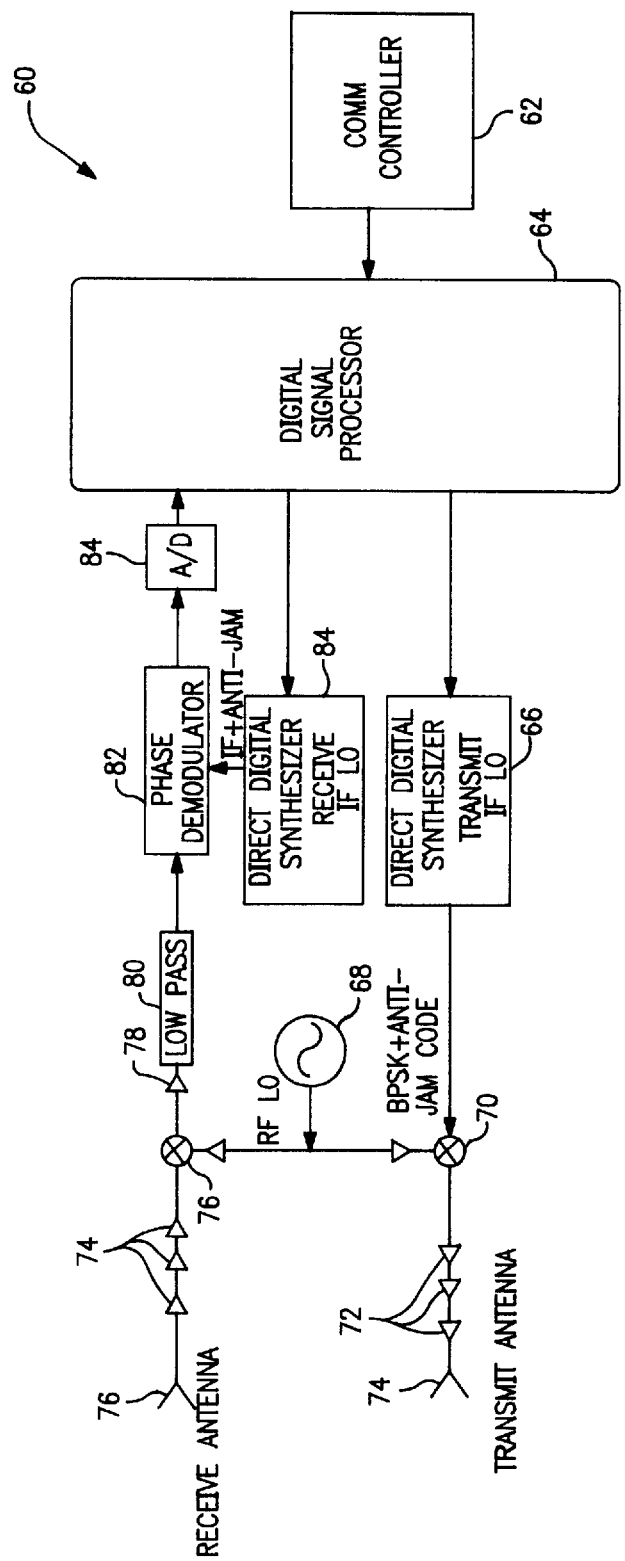
FIG. 3 is a block diagram of a communication system having independent, adaptive modulation controls for the local oscillators arranged in accordance with the principles of a second embodiment of the invention.

In addition to radar applications, the dual local oscillator configuration may also be used for electromagnetic communication systems. Referring to FIG. 3, communication system 60 uses independent DDSs to implement the intermediate frequency local oscillators (IF LOs) for a binary phase shift keyed (BPSK) data modulation communication system. The communication system 60 includes a communication controller 62 which provides transmit/receive modulation control commands to effect signal modulation which defeats communication system jammers. The control signals are output to DSP 64 which outputs control signals to transmit IF LO 66. DSP 64 generates the control signal output by digital signal processor 64 to include data modulation information, anti-jam modulation information, and IF carrier signal information. IF LO 66 outputs a signal having encoded onto the IF carrier signal the BPSK data modulation plus the anti-jam code information. RF LO 68 outputs an RF carrier signal which is modulated by the signal output by transmit IF LO 66. The signals are added at mixer 70. Mixer 70 adds the signals in the frequency domain resulting in an output signal $F_{DATA}+F_{CAR}$, where $F_{DATA}$ is the frequency of the signal output by IF LO 66 and $F_{CAR}$ is the frequency of the RF carrier signal output by RF LO 68. The output from mixer 70 is input to an amplifier chain comprising a trio of amplifiers 72, which conditions the signal for input to transmit antenna 74. Transmit antenna 74 transmits the modulated carrier signal in the direction of the other communication system.

The conventional BPSK system is vulnerable to jamming systems which exploit knowledge of the data modulation. For example, a jammer could broadcast a jamming signal whose modulation is intended to distort the output of the BPSK modulator. To suppress this type of jammer interference, the anti-jam communication system 60 modifies the normal BPSK modulation. The new modulation signal is normal BPSK signal plus a coded sequence of frequency modulation (FM) shifts. The anti-jam code has a rate which exceeds the data rate, but is not necessarily synchronized to the data rate.

The broadcast signal is received by a matched communication system arranged similarly to communication system 60. A receive antenna 76 receives the encoded signal. The received signal passes through an amplifier chain comprising a trio of amplifiers 74 and is input into mixer 76. Mixer 76 subtracts the RF carrier signal output by RF LO 68 from the return signal to yield ($F_{RTN}-F_{CAR}$), where $F_{RTN}$ is the frequency of the returned signal and $F_{CAR}$ is the frequency of the RF carrier signal output by RF LO 68. The output from the mixer 76 is then input into an amplifier 78 and then into low pass filter 80. Low pass filter 80 passes only low frequency components of the input signal to ensure that only the component representing the subtracted signals is input into phase demodulator 82. Phase demodulator 82 demodulates the received communication signal to leave only the normal BPSK data modulation signal. A receive IF LO 84 provides a signal having IF carrier and anti-jam code information to phase demodulator 82. Receive IF LO is implemented using a DDS, as described above. Phase demodulator 82 outputs a baseband signal in BPSK format which is input to A to D converter 84. The output from the A to D converter 84 is then input into DSP 64.

As described above, the communication system 60 of FIG. 3 operates in conjunction with a matching, similarly configured communication system. The two matching communication systems to exchange data must first match anti-jam code rates and FM deviations. The receive IF LO 84 adds the anti-jam code to the normal IF carrier frequency. The receiver anti-jam code is time synchronized to the code received from the transmitting system. This time synchronization enables removal of the anti-jam code from the IF signal input to the phase demodulator. Upon receipt of the jammer signal code, however, is not synchronized in time with the real data signal code.

Figure 4:
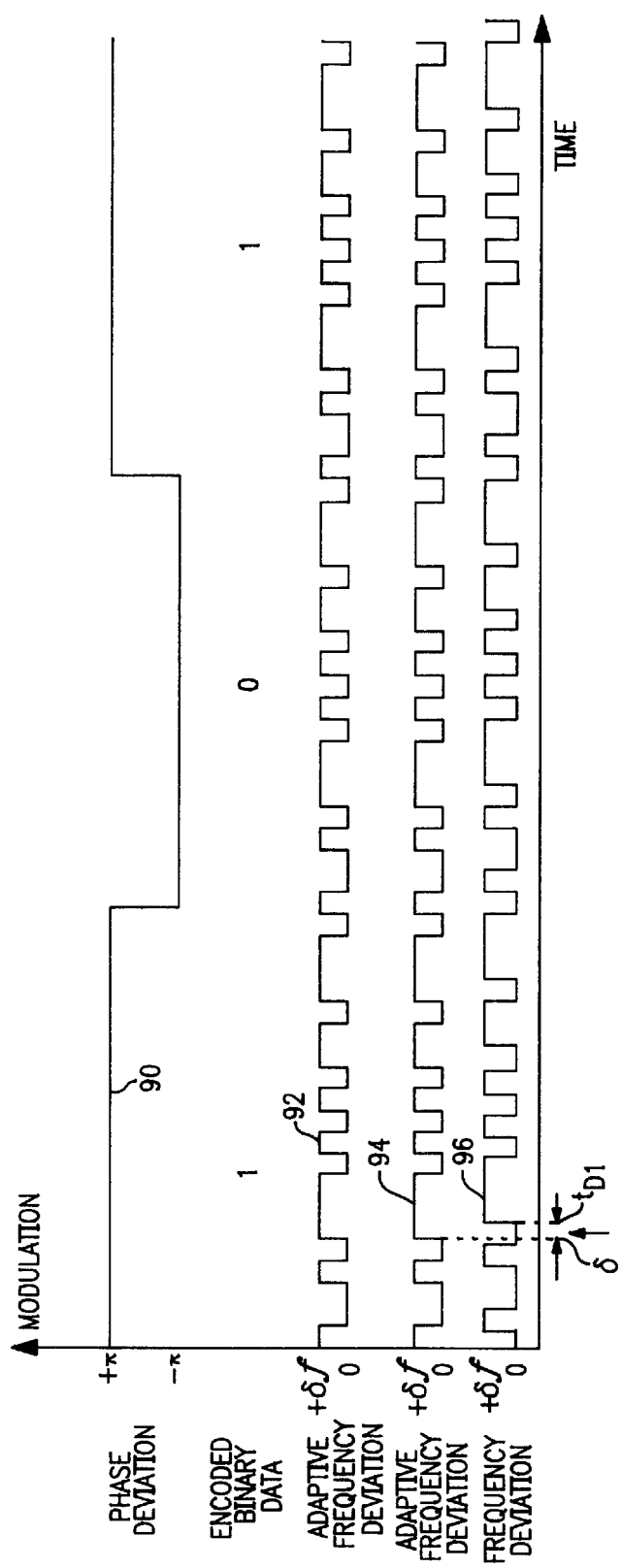
FIG. 4 is a graph showing communication signals transmitted and received by the system of FIG. 3.

An example of the foregoing may be further explained with reference to FIG. 4. In FIG. 4, a BPSK waveform 90 is shown having a phase deviation from $-\pi/2$ to $+\pi/2$ and represents a binary encoded data one $+\pi/2$ and zero $-\pi 2$. The transmitting communication system provides an anti-jam frequency code 92. A receiving system must also include an anti-jam frequency code 94 which matches the transmitting system anti-jam frequency code 92. The frequency jammer, however, copies the transmitter code 92 to produce frequency jammer signal 96, but cannot synchronize to the receiver code timing. The resulting frequency jammer signal 96 is offset from the received anti-jam frequency case 94 by $\delta t_{DJ}$. The failure to time synchronization eliminates the anti-jam code from the IF signal input to the phase demodulator. The frequency jammer signal 96 is not received synchronized with the real data signal codes, 92 and 94. This timing mismatch imposes a wideband frequency modulation on the jamming signal at the IF input to the phase demodulator 82. This wideband modulation spreads the jammer power over the code modulation bandwidth. The bandwidth of the phase demodulator, however, is much narrower than the code rate. The demodulator 82 will reject substantially all of this wideband jamming signal. Thus, the jammer interference is strongly suppressed. The jammer's suppression can be further optimized by tuning the anti-jam code deviation and/or the code rate. Because the jammer lacks knowledge of the jammer FM code phase relative to the data signal FM code phase and the receiving system, the jammer cannot counter this anti-jam communication system 60.

The anti-jam technique requires a preprogrammed search for optimal anti-jam modulation code. The preprogrammed search is initiated automatically at regularly scheduled intervals whenever jamming interferes with data reception. During the search, the two communications systems attempt to exchange data. When the systems discover an effective anti-jam code, the search process stops and normal communication continues using the optimized anti-jam code. This anti-jam optimization process requires extremely precise timing synchronization between physically separated communication nodes. Further, synchronization must be maintained in temporary intervals when jamming has started and the anti-jam modulation has not yet been optimized. Preferably, the preprogrammed anti-jam modulation switching is synchronized to a small fraction of the anti-jam code interval. Thus, each of the anti-jam communication systems must be synchronized to highly accurate clocks, such as, cesium clocks.

One skilled in the art will recognize from the above detailed description that using independent, adaptive modulation controls for the local oscillators in the transmitter and receiver enables the radar or communication systems to suppress the repeater jammer signal while maintaining a good signal-to-noise ratio (SNR) on the target or communication signal. In particular, the radar or communication systems adjust signal modulation to minimize SNR at the jammer range and maximize the SNR at the target range. The independent, adaptive local oscillators used in the present invention are sufficiently variable to enable varying the modulation and demodulation signals to while the range to the target and jammer are both changing.

Although the invention has been described with particular reference to certain preferred embodiments thereof, variations and modifications can be effected within the spirit and scope of the following claims.

What is claimed is:

1. A radar system for emitting a transmit signal toward an object and receiving a return signal reflected from the object, comprising:

a signal processor for generating control commands to effect encoding of the transmitted signal and decoding of the return signal;

a first local oscillator implemented using a direct digital synthesizer and being responsive to the control commands from the signal processor, the first local oscillator generating a first modulation signal having an anti-jamming code for transmission by the radar system;

a radio frequency oscillator for generating a carrier signal modulated by the first modulation signal, the modulated carrier signal being transmitted by the radar system;

a second local oscillator implemented using a direct digital synthesizer and being responsive to the control commands from the signal processor, the second local oscillator generating a second modulation signal to remove the anti-jamming code from the return signal, where the return signal varies in accordance with the first modulation signal and the first and second local oscillators are controlled independently to produce distinct first and second modulation signals;

a first mixer for modulating the carrier signal with the first modulation signal prior to transmission by the radar system;

a second mixer for demodulating the modulation signal from the return signal;

at least one third mixer for removing the anti-jamming code from the demodulated signal, the third mixer receiving the anti-jamming code from the second local oscillator; and a plurality of receive antennas to receive the return signal, the return signal being decoded to provide range, speed, and bearing information of the object.

2. The radar system of claim 1 further comprising:

a first antenna for transmitting the transmit signal; and a second antenna for receiving the return signal.

3. A communication system for transmitting and receiving electromagnetic signals having information contained therein, comprising:

a signal processor for generating control commands to encode the transmitted signal and to decode the received signal;

a first local oscillator implemented using a direct digital synthesizer and being responsive to the control commands from the signal processor, the first local oscillator generating a first modulation signal, the first modulation signal containing an informational component and an anti-jamming component;

a radio frequency oscillator for generating a carrier signal modulated by the first modulation signal, the modulated signal being transmitted by the communication system;

a phase demodulator for demodulating the received signal, the received signal having an informational component and an anti-jamming component, the demodulator demodulating the anti-jamming component from the received signal;

a second local oscillator implemented using a direct digital synthesizer and being responsive to control commands from the signal processor, the second local oscillator generating a second modulation signal for input to the phase demodulator to enable demodulation of the anti-jamming component from the received signal, where the second modulation signal varies in accordance with the carrier signal and the first and second local oscillators operate independently to produce distinct first and second modulation signals;

a first mixer for modulating the carrier signal with the first modulation signal prior to transmission by the communication system;

a second mixer for removing the anti-jam component from the received signal;

a first antenna for transmitting the transmit signal; and a second antenna for receiving the received signal.

* * * * *